(12) United States Patent
Moroney (10) Patent No.: US 6,584,225 B1
(45) Date of Patent: Jun. 24, 2003

(54) FREQUENCY DOMAIN HALFTONING

(75) Inventor: Nathan M. Moroney, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/567,200

(22) Filed: May 8, 2000

(51) Int. Cl.$^7$ .............................................. H04N 1/405
(52) U.S. Cl. ...................... 382/235; 382/250; 382/280; 358/1.9; 358/3.06
(58) Field of Search .................................. 382/250, 246, 382/248, 268, 235, 254, 237, 280, 281, 100; 358/3.06, 3.09, 534, 3.03, 426.12, 1.9, 452; 345/596; 347/131; 348/671; 375/240.24

(56) References Cited

U.S. PATENT DOCUMENTS

| | | | | |
|---|---|---|---|---|
| 4,922,273 A | * | 5/1990 | Yonekawa et al. | 382/250 |
| 5,121,445 A | * | 6/1992 | Tsujiuchi et al. | 382/280 |
| 6,064,764 A | * | 5/2000 | Bhaskaran et al. | 382/183 |
| 6,069,980 A | * | 5/2000 | Honda | 382/268 |
| 6,195,472 B1 | * | 2/2001 | So et al. | 382/296 |
| 6,286,100 B1 | * | 9/2001 | Morimoto et al. | 713/176 |
| 6,307,885 B1 | * | 10/2001 | Moon et al. | 375/240.08 |
| 6,351,492 B1 | * | 2/2002 | Kim | 375/240.08 |
| 6,421,386 B1 | * | 7/2002 | Chung et al. | 375/240.24 |

OTHER PUBLICATIONS

Gonzalez et al, Digital Image Processing, 1992, Addison–Wesley Publishing Co, Inc, p 663–667.*

J S Chen, A comparative study of digital halftoning techniques, Prceedings of the IEEE 1992 National Aerospace and Electronics Conference, May 18–22 1992, vol. 3, p 1139–1145.*

* cited by examiner

*Primary Examiner*—Bhavesh M. Mehta
*Assistant Examiner*—Christopher Sukhaphadhana (57) ABSTRACT

A method of processing an image includes the step of transforming spatial image data to generate a first set of frequency domain basis coefficients. The first set of basis coefficients is combined with a second set of basis coefficients corresponding to a frequency domain transform of a pre-determined halftone texture. In various embodiments, the forward transform is a selected one of the discrete cosine transform, the discrete sine transform, and the Fourier transform. The combined basis coefficients are quantized and entropy encoded to generate the compressed image data. After any necessary decompression, an inverse transform may be subsequently performed to reconstruct the source spatial image with the pre-determined halftone texture. In one embodiment, a method of processing a source image includes the step of scanning the source image to generate digitized spatial image data. The digitized data is subdivided into a plurality of blocks. A forward transform is applied to each block to generate source image basis coefficients. The source image basis coefficients are then combined with halftone basis coefficients corresponding to a pre-determined halftone texture. The combined basis coefficients may be quantized and entropy encoded to generate the compressed image data. After decompression, the spatial image reconstructed through inverse transformation incorporates the pre-determined halftone texture.

15 Claims, 4 Drawing Sheets

FREQUENCY DOMAIN HALFTONING

FIELD OF THE INVENTION

This invention relates to the field of image processing. In particular, this invention is drawn to digital halftoning and image compression.

BACKGROUND OF THE INVENTION

The process of digitizing a spatial representation of a source image or manipulating the digital data corresponding to the source image is frequently referred to as digital image processing. A continuous tone source image can be digitized by quantifying discrete regions of the image (i.e., pixels) into a range of finite, discrete values that can be represented digitally (pixel values). In digital form, the source image may be easily copied and distributed. The digital representation of the spatial image can then be used to reconstruct the source image. Differences between the source image and the reconstructed image result at least in part from the quantification of analog values. Reduction of the spatial image information through a compression process may result in the introduction of additional artifacts into the reconstructed image.

Techniques such as halftoning or dithering may be used to ameliorate the perceived effect of quantification and compression in image reproduction. These techniques rely on the tendency of the human eye to average or blend the discrete units.

In an image processing pipeline, spatial quantization, compression, and halftoning are serially performed steps. Spatial quantization and halftoning are performed in the spatial domain. Compression typically takes place in the frequency domain. Transforming from one domain to another and then back again is computationally expensive. Moreover, the serial performance of these steps undesirably increases the length of the image processing pipeline.

SUMMARY OF THE INVENTION

In view of limitations of known systems and methods, a method of processing an image includes the step of transforming spatial image data to generate a first set of frequency domain basis coefficients. The first set of basis coefficients are combined with a second set of basis coefficients corresponding to a frequency domain transform of a pre-determined halftone texture. In various embodiments, the forward transform is a selected one of the discrete cosine transform, the discrete sine transform, and the Fourier transform. The combined basis coefficients are quantized and entropy encoded to generate the compressed image data. After any necessary decompression, an inverse transform may be subsequently performed to reconstruct the source spatial image with the pre-determined halftone texture.

In one embodiment, a method of processing a source image includes the step of scanning the source image to generate digitized spatial image data. The digitized data is subdivided into a plurality of blocks. A forward transform is applied to each block to generate source image basis coefficients. The source image basis coefficients are then combined with halftone basis coefficients corresponding to a pre-determined halftone texture. The combined basis coefficients may be quantized and entropy encoded to generate the compressed image data. After decompression, the spatial image reconstructed through inverse transformation incorporates the pre-determined halftone texture.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
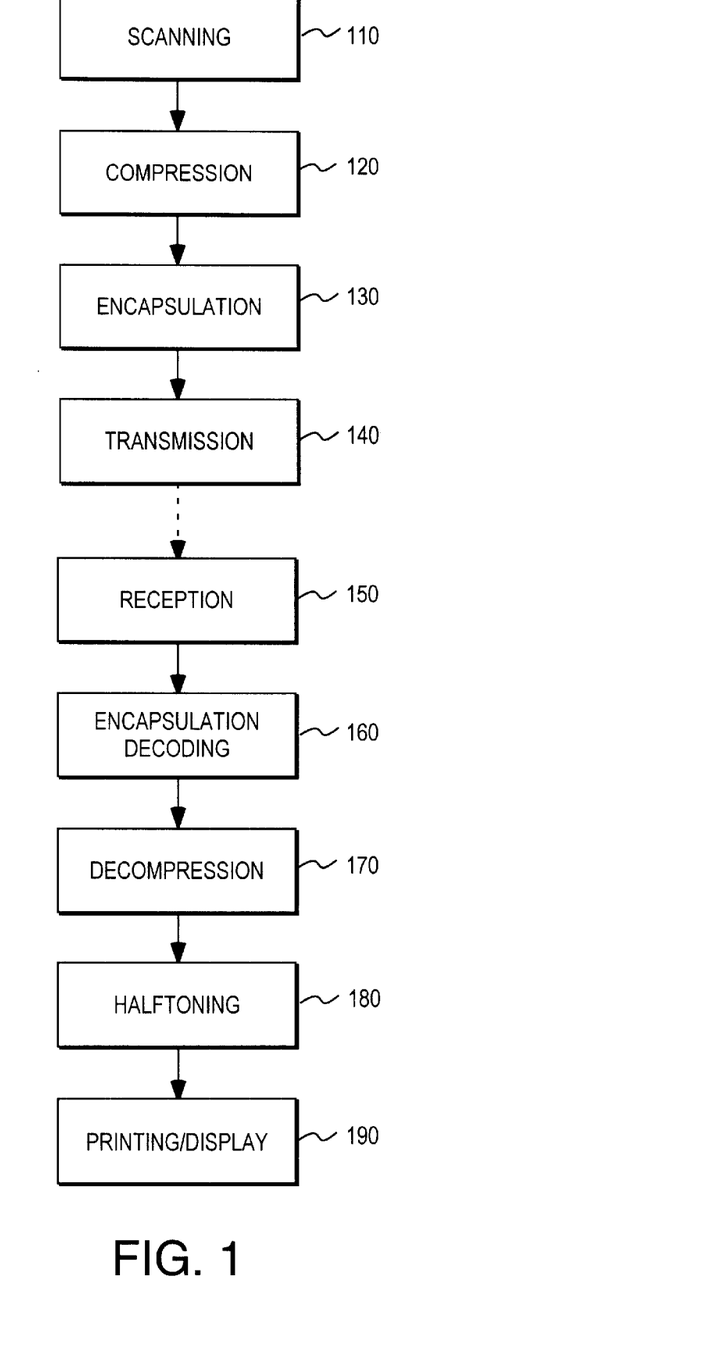
FIG. 1 illustrates one embodiment of an image processing pipeline for facsimile transmission.

FIG. 1 illustrates one embodiment of an image processing pipeline associated with a facsimile process. In step 110, a source image is scanned to create a digital representation of the source image. The digital representation is compressed in step 120. The compressed image may then be encapsulated in step 130 to facilitate error correction and other administrative functions during transmission. The encapsulated data is then transmitted or otherwise made available for distribution in step 140.

In step 150, the encapsulated data is received for processing by an answering facsimile device. The compressed image data is extracted from encapsulation through encapsulation decoding in step 160. The compressed image data may then be decompressed in step 170. Finally, the decompressed image data may be used to spatially reconstruct the source image. In one embodiment, the image is spatially reconstructed and printed or displayed in step 190. Depending upon the output device, the process of reconstructing the source image may incorporate halftoning to enable rendering the image within the constraints of the output device. A cathode ray tube (CRT) or monitor may be capable of displaying varying levels of color or grayscale by varying a voltage. Printers such as an ink jet printer, however, can only elect between depositing an ink drop or not depositing an ink drop at a particular location. Thus a halftoning step 180 may be applied before printing or displaying the image in step 190.

The scanning and compression steps effectively control the volume of data to be stored or transmitted. The scanning resolution determines the raw digitized image quality and the volume of data to be compressed. The scanning resolution typically involves tradeoffs between image quality, scanning time, and volume of data. Compression typically involves tradeoffs between computational power or time, volume of compressed data, and image quality.

Faster scanning or compression may often be accomplished at the cost of degraded quality for the reconstructed image. Conversely, maintaining a high image quality frequently results in longer time requirements for scanning and compression and results in a larger compressed image size. For facsimile applications larger compressed image sizes require a longer time to transmit. For applications such as storage and distribution, larger compressed image sizes require greater amounts of space on the storage medium. Tailoring the scanning and compression steps to achieve desirable throughput or desired data volume constraints generally results in manipulating image quality within perceptually acceptable limits. These perceptually acceptable limits are affected by the type and quality of the source images.

Continuous tone images refer to images that have a virtually unlimited range of color or shades of gray. Photographs, for example, are continuous tone images. Digital hardware, however, is limited to expressing color or tone within a finite number of bits or even a single bit (i.e., "on" or "off"). Gray scaling and dithering are two processes used to approximate continuous tone images within the limitations of digital hardware.

Gray scaling is the process of creating the illusion of continuous tone through the use of patterns of "dots" where each dot can have a different shade of gray. Dots can be any variety of shapes. Circular or elliptical dots are common in printing applications. Rectangular or square dots (e.g., pixels) are common geometries in display technologies such as computer monitors. Although the number of gray scales is necessarily finite, there are typically enough shades (e.g., 256 for an 8 bit pixel) so that the difference between one shade and the next is imperceptible to the human eye.

Dithering is a process of creating the illusion of new colors and shades by varying the density, pattern, and the size of dots. Individual dots do not have variable levels of shading. Thus for black and white imagery different shades of gray are simulated by varying the density and pattern of black and white dots. In printing, dithering is called halftoning and the shades of gray realized through particular patterns of black and white dots are called halftones.

In conventional printing, halftones are created by photographing an image through a screen. The screen frequency determines the number of dots used to make each spot of gray. In digital image processing, screening parameters include screen frequency, recorder resolution and halftone dots, and dot size and shape. In contrast with traditional screening, dithering or halftoning of an image for digital image processing is usually accomplished through the use of a threshold array in the spatial domain to achieve a specific texture in the final binary image. Although the threshold array may have a specific frequency response as a design criterion, the resulting threshold array is applied in the spatial domain. Thus halftoning step 180 of FIG. 1 is conventionally performed in the spatial domain. The particular halftone texture used may also be chosen to perceptually ameliorate the effects of compression.

One technique for compressing the digital representation of the source image data includes the step of transforming the spatial domain image data into frequency domain data. Transformation from the spatial domain into the frequency domain is also referred to as a forward transform.

The forward transformation is analogous a harmonic analysis of the source image. A forward transform is used to represent the spatial image data as linear combinations of basis functions. The coefficients for these basis functions are determined during the transformation process.

The basis coefficients are then quantized or thresholded to eliminate contributions from the corresponding basis function to achieve some level of compression. The remaining coefficients are then re-ordered or run-length encoded or otherwise processed to facilitate further compression of the image data. The resulting compressed image data is then available for storing, distribution, or for further processing. Referring to FIG. 1, these elements of compression are incorporated into step 120.

Reconstruction of the source image data from the compressed data requires the step of decompression. After decompression, an inverse transform (frequency-to-spatial domain transformation) must be performed to reconstruct the spatial image from the digital data corresponding to the frequency domain representation of the source image. The inverse transform may be though of as a harmonic synthesizer. Typically, the decompression step 170 includes the step of decompression and inverse transformation so that the resulting data is a spatial domain representation of the source image. The reconstructed source image may be subsequently rendered in the spatial domain.

One spatial-to-frequency domain transform is the Discrete Cosine Transform (DCT). The DCT is one of many transforms that can be used to represent signals as linear combinations of basis functions. Other transforms include the Fourier transform and the discrete sine transform (DST). The DCT transformation is effectively a harmonic analyzer. The inverse DCT (IDCT) transformation for converting the frequency domain data back into the spatial domain is analogous to a harmonic synthesizer.

The Joint Photographic Experts Group (JPEG) and the Motion Picture Experts Group (MPEG) have each promoted popular image compression and encoding architectures that use the DCT transformation algorithm. In particular, JPEG compression is frequently used for static images such as those encountered in facsimile or standard printing applications. The MPEG format is used for dynamic images or movies.

The basis functions for the one dimensional DCT on an interval are defined as follows:

$$B_i(n) = \cos\left(\frac{(2n+1)i\pi}{2N}\right); \quad i, n \in [0, N-1]$$

Given a discrete time signal, s(n), the forward transform is a process of finding coefficients, $c_i$, such that the discrete time signal s(n) may be represented as a linear combination of the basis functions $B_i(n)$ as follows:

$$s(n) = \sum_{i=0}^{N-1} c_i \lambda_i B_i(n); \quad i, n \in [0, N-1]$$

The basis coefficients for the one dimensional DCT are calculated as follows:

$$c_i = \lambda_i \sum_{n=0}^{N-1} s(n) \cos\left(\frac{(2n+1)i\pi}{2N}\right); \quad \begin{cases} i \in [0, N-1] \\ \lambda_i = \sqrt{1/N}, & i = 0 \\ \lambda_i = \sqrt{2/N}, & i \neq 0 \end{cases}$$

A source image is sampled as a two dimensional array of discrete values, s(m,n). Performing a two dimensional forward transform entails calculating the basis coefficients c(i,j) such that s(m,n) can be expressed as a linear combination of basis functions. In one embodiment, a forward transform involves calculating c(i,j) such that:

$$s(m, n) = \sum_{i=0}^{N-1} \sum_{j=0}^{N-1} c(i, j) \lambda(i, j) \cos\left(\frac{\pi(2m+1)i}{2N}\right) \cos\left(\frac{\pi(2n+1)j}{2N}\right)$$

-continued $$\begin{cases} i, j \in [0, N-1] \\ \lambda(0, j) = 1/N \\ \lambda(i, 0) = 1/N \\ \lambda(i, j) = 2/N \text{ for } i, j \neq 0 \end{cases}$$

In one embodiment of the DCT, the coefficients c(i,j) are calculated as follows:

$$c(i, j) = \lambda(i, j) \sum_{n=0}^{N-1} \sum_{m=0}^{N-1} s(m, n) \cos\left(\frac{\pi(2m+1)i}{2N}\right) \cos\left(\frac{\pi(2n+1)j}{2N}\right);$$

$$i, j \in [0, N-1]$$

The two dimensional DCT transform involves identifying the coefficients for a set of basis functions that collectively make up the image.

Figure 2:
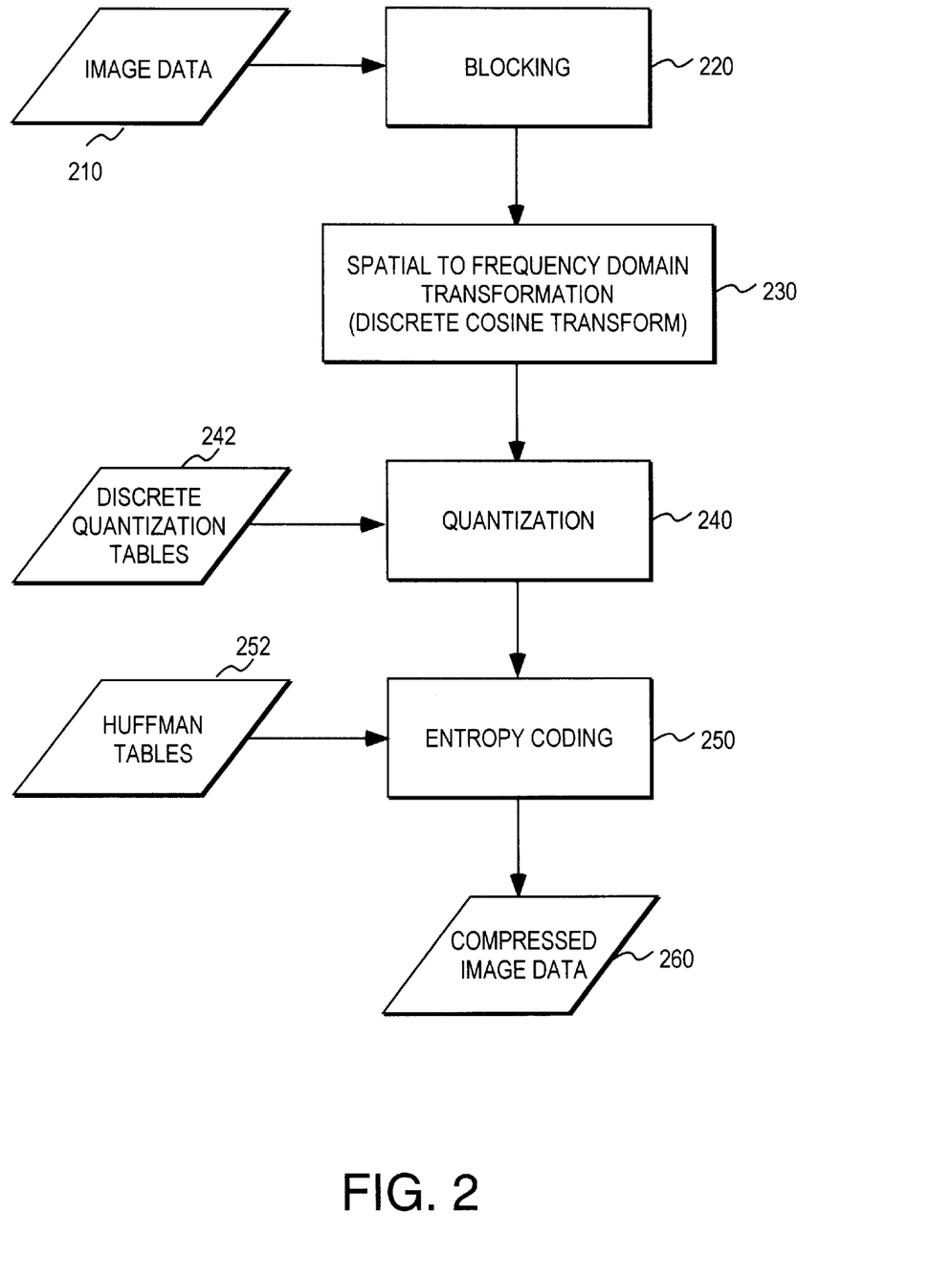
FIG. 2 illustrates one embodiment of an image compression process.

FIG. 2 illustrates one embodiment of an image compression process that may be incorporated, for example, into step 120 of FIG. 1. Compression begins by subdividing the source spatial image data into multiple blocks of picture elements. Thus the image data 210 corresponding to the spatial image is blocked in step 220. In one embodiment, the blocks are 8 pixels by 8 pixels in size. A forward transform is performed on the blocked data in step 230.

In one embodiment, the DCT is used for the forward transform 230. Each block is represented as a discrete signal and is encoded using the DCT to convert the value of each discrete signal into a basis coefficient value. The coefficients are then further processed to facilitate compression.

For example, some basis coefficients may be eliminated to effectively eliminate contributions from the corresponding basis functions. Thus in step 240, quantization is performed on the transformed image data using discrete quantization tables 242. The quantized image data is then further compressed through entropy coding in step 250 using Huffman tables 252 to generate compressed image data 260. Huffman coding is a compression technique that assigns codes based on the relative frequencies of the individual elements of a given set of data. The more often a given element occurs, the smaller the number of bits that are used for the corresponding code.

A JPEG viewer processes the compressed image data to extract a decompressed version of the transformed image and subsequently inversely transforms the frequency domain information into spatial domain information to generate a reconstructed image for viewing. Halftoning or dithering is typically applied during reconstruction of the source image in order to threshold the data for adequate rendering on a device or medium that can only realize finite, quantized values of tone. Knowledge of the particular limitation or capabilities of the device to be used for reconstruction may be useful when selecting the particular halftone texture. In particular, the halftone texture may be chosen to perceptually ameliorate the effects of the compression.

Instead of applying the halftoning process in the spatial domain (i.e., step 180), however, the halftoning step may be performed in the frequency domain substantially simultaneously with compression.

Figure 3:
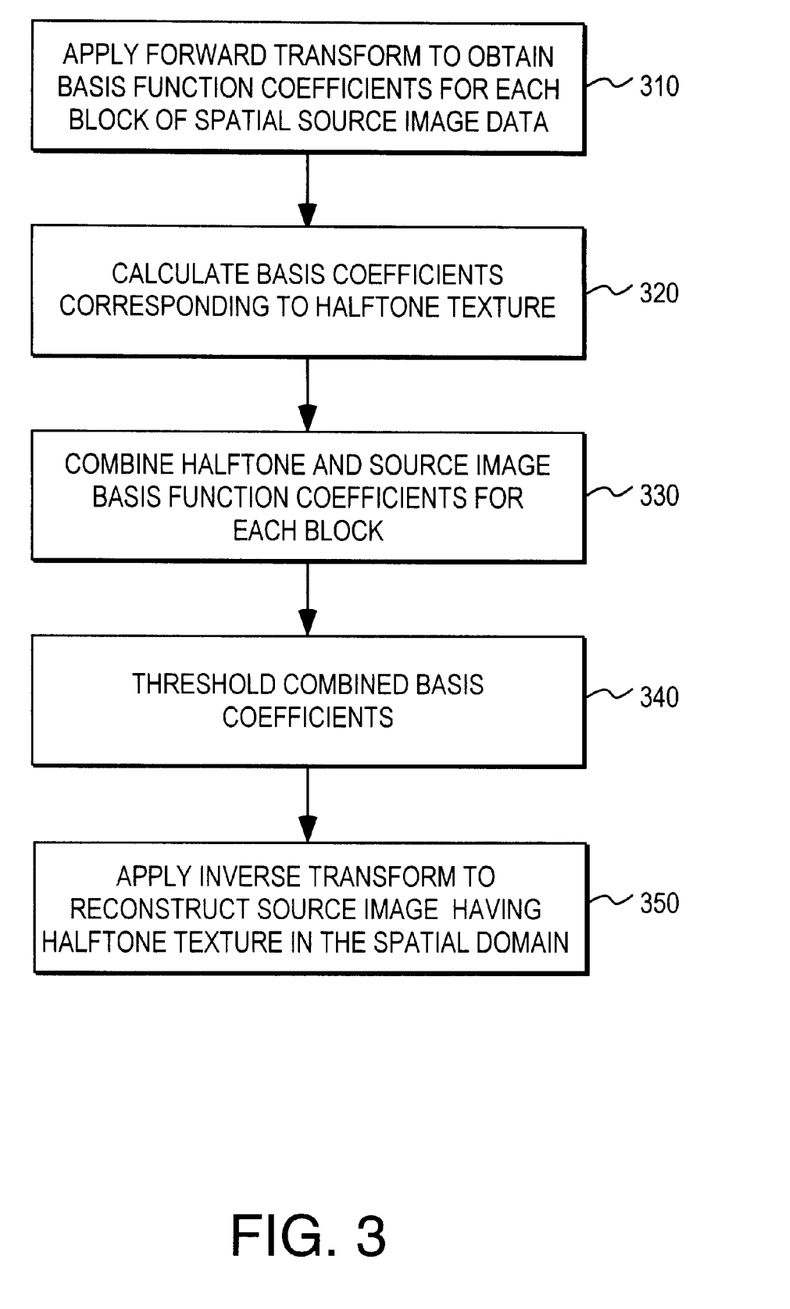
FIG. 3 illustrates a method of performing frequency domain halftoning.

FIG. 3 illustrates one embodiment of a method of combining halftoning with compression in the frequency domain. In step 310, a frequency domain transform is performed on spatial domain source image data to obtain source image basis coefficients. In step 320, a frequency domain transform is performed on a halftone texture to obtain basis coefficients corresponding to the halftone texture.

The corresponding basis function coefficients for the halftone and source image data are combined in step 330. In particular, the halftone basis coefficients and the basis coefficients corresponding to the source image are added in step 330. In step 340, the combined basis coefficients are quantized through thresholding. Although each block of image data must be forward transformed, the forward transform of the halftone texture need only be computed once.

An inverse transform is performed in step 350 to generate an intermediary spatial domain image including halftoning. The intermediary spatial domain image is then thresholded to produce a halftoned reconstructed source image in step 360.

Figure 4:
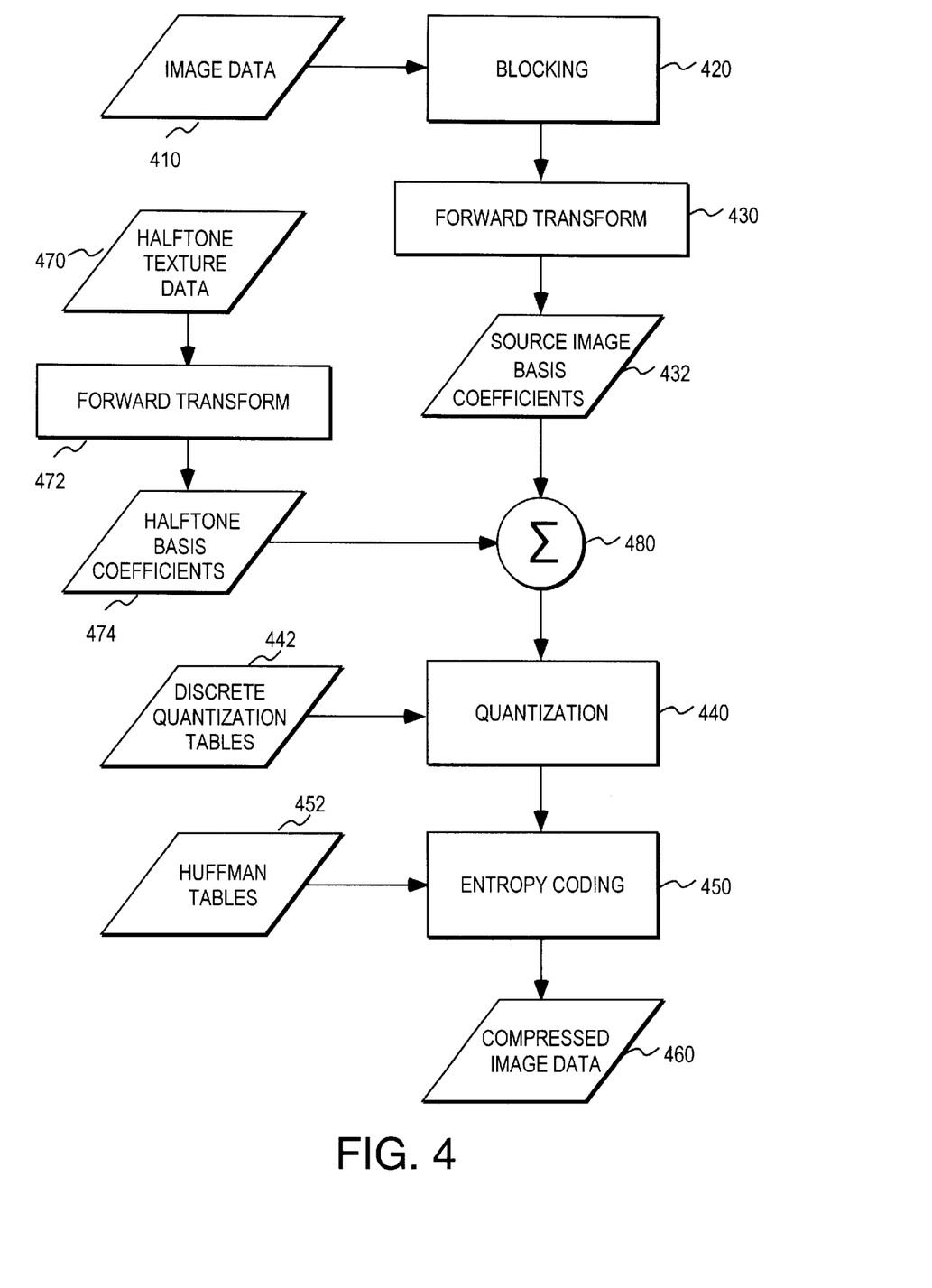
FIG. 4 illustrates an image compression process incorporating halftoning in the frequency domain.

FIG. 4 illustrates a modified compression technique incorporating frequency domain halftoning as illustrated in FIG. 4. The source image data 410 is blocked in 420. A forward transform is performed in step 430 to generate source image basis coefficients 432 for each block. For JPEG, DCT is the selected transform. The basis coefficients of the transformed block of source image data 430 are summed with the corresponding halftone basis coefficients 474 in step 480. The resulting image data is quantized in step 440 with quantization tables 442. The quantized data is then entropy coded in step 450 using Huffman tables 452 to generate compressed image data 460.

The halftone texture basis coefficients 474 are obtained by performing a forward transform in step 472 on the halftone texture data 470 corresponding to the desired halftone texture. The halftone texture data 470 corresponds to a thresholding array. Although the forward transform must be performed on each block of image data, the forward transform of the halftone texture need only be computed once. The same transform should be used for both halftone and image block frequency-to-spatial domain transformation steps (i.e., steps 430 and 470). In one embodiment, the DCT is used in step 470.

The frequency domain transform of commonly used halftone textures can be stored to eliminate computation of the transform each time for the halftone texture. In particular, the forward transform of the halftone texture can be calculated once for the entire source image rather than for each block of source image data.

The resulting compressed image data 460 already incorporates the desired halftone texture so that subsequent halftoning in the spatial domain is unnecessary. From a recipient's perspective, elimination of spatial domain halftoning will speed up the printing or display pipeline. Thus compressed image data communicated by facsimile, for example, can be printed upon determining the inverse transform without the additional step of being spatially halftoned.

The appendix includes an example of C program code for computer implementation of frequency domain halftoning. The program code illustrates instructions for performing the forward transformation of both source image and halftone texture data, combining the corresponding basis coefficients to realize frequency domain halftoning, and performing the inverse transformation to reconstruct the spatial image data with halftoning.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

APPENDIX

Example C program for simultaneous decompression and halftoning

```
/*
    File:       dcttone.c
    Author:                 NMMoroney, HP Labs, PTD, CCR
*/
#include <stdio.h>
#include <stdlib.h>
#include <math.h>
#define N 8
#define M 8
#define W 100
#define H 100
#define PI 3.141592654
#define COEFF      0.707106781
main(argc, argv)
    int             argc;
    char     *argv[ ];
{
int i, j, k, u, v, x, y, in, out, buffer[ N] [ W*N] , R;
float accum, twoN, twoM, scale, forward[ M] [ N] , dct[ M] [ N] ,
random;
float Cu, Cv, inverse[ M] [ N] , d, DC, array[ M] [ N] ;
FILE *in_file, *out_file;
if (argc != 3) {
    printf ("\n\n Usage: dcttone -in.dat -out.dat < msk.dct
\n\n");
    printf (" Simultaneous decompression and halftoning.
\n\n");
    exit(1);
}
if ((in_file = fopen(argv[ 1], "r") ) == NULL) {
    printf ("Cant open %s as input file.
Bailing...", argv[ 1] );
    exit (1);
}
if ((out_file = fopen(argv[ 2] , "w") ) == NULL) {
    printf ("Cant open %s as output file.
Bailing...", argv[ 2] );
    exit (1);
}
twoN = 2.0 * N;
twoM = 2.0 * M;
scale = (2.0 / sqrt((double)M*N));
srand (1969);
for (i = 0; i < N; i++) {
    for (j = 0; j < M; j++) {
        scanf ("%f", &array[ i] [ j] ) ;
    }
}
for (i = 0; i < H; i++) {
printf ("Buffer %d \n", i);
    /* Load data buffer. */
    for (j = 0; j < M; j++) {
        for (k = 0; k < W*N; k++) {
            fscanf (in_file, "%i", &in);
            buffer[ j] [ k] = in;
        }
    }
    for (j = 0; j < W; j++) {
        /* Load sub-region. */
        for (x = 0; x < M; x++) {
            for (y = 0; y < N; y++) {
                forward[ x] [ y] = (double)buffer[ x] y+j*N] ;
            }
        }
        /* FDCT */
        for (u = 0; u < M; u++) {
            for (v = 0; v < N; v++) {
                accum = 0.0;
                for (x = 0; x < M; x++) {
                    for (y = 0; y < N; y++) {
                        accum += (cos((PI*u* (2*x+1))/twoM) *
                                  cos((PI*v* (2*y+1))/twoN) *
```

APPENDIX-continued

Example C program for simultaneous decompression and halftoning

```
forward[ x] [ y] );
                        }
                }
                accum *= scale;
                if (u == 0) accum *= COEFF;
                if (v == 0) accum *= COEFF;
                dct[ u] [ v] = accum;
            }
        }
        /* Filter DCT coefficients. Add image and halftone DCT
coefficients. */
        for (x = 0; x < M; x++) {
            for (y = 0; y < N; y++) {
                if ((x > 0) || (y > 0)) dct[ x] [ y] = dct[ x] [ y] +
array[ x] [ y] ;
            }
        }
        /* IDCT */
        for (x = 0; x < M; x++) {
            for (y = 0; y < N; y++) {
                accum = 0.0;
                for (u = 0; u < M; u++) {
                    for (v = 0; v < N; v++) {
                        if (u == 0)  Cu = COEFF;
                        else         Cu = 1.0;
                        if (v == 0)  Cv = COEFF;
                        else         Cv = 1.0;
                        accum += (Cu * Cv *
cos((PI*u* (2*x+1))/twoM) *
                                  cos((PI*v* (2*y+1))/twoN) * dct[ u] [ v] );
                    }
                }
                inverse[ x] [ y] = accum * scale;
            }
        }
        /* Load sub-region. */
        for (x = 0; x < M; x++) {
            for (y = 0; y < N; y++) {
                butfer[ x] [y+j*N] = (int)inverse[ x] [ y] ;
            }
        }
        /* Output data buffer. */
        for (j = 0; j < M; j++) {
            for (k = 0; k < W*N; k++) {
                if (buffer[ j] [ k] < 128) out = 0;
                else         out = 255;
                fprintf (out_file, "%i\n", out);
                /* fprintf (out_file, "%i\n", buffer[ j] [ k] ); */
            }
        }
    }
}
fclose(in_file);
fclose(out_file);
} /* End of File. */
```

What is claimed is:

1. A method of processing an image, comprising the steps of:

a) transforming spatial image data to generate a first set of frequency domain basis coefficients; and b) combining the first set of basis coefficients with a second set of basis coefficients, wherein the second set of basis coefficients correspond to a frequency domain transform of a pre-determined halftone texture.

2. The method of claim 1 further comprising the step of:

c) applying an inverse transform with the combined coefficients to produce halftoned spatial image data.

3. The method of claim 1 wherein step a) includes the step of performing a discrete cosine transform.

4. The method of claim 1 wherein step a) includes the step of performing a discrete sine transform.

5. The method of claim 1 wherein step a) includes the step of performing a Fourier transform.

6. The method of claim 1 further comprising the step of:

c) quantizing the combined basis coefficients.

7. The method of claim 1 further comprising the step of:

d) entropy encoding the quantized combined basis coefficients to compress the image data.

8. A method of processing an image comprising the steps of:

a) scanning an image to generate digitized spatial image data;

b) subdividing the digitized data into a plurality of blocks;

c) performing a forward transform on a selected block to generate source image basis coefficients; and d) combining the source image basis coefficients of the selected block with halftone basis coefficients corresponding to a forward transform of a pre-determined spatial halftone texture.

9. The method of claim 8 further comprising the step of:

e) applying an inverse transform on the combination of step d) to produce halftoned digitized spatial image data.

10. The method of claim 8 wherein step c) includes the step of performing a discrete cosine transform.

11. The method of claim 8 wherein step c) includes the step of performing a discrete sine transform.

12. The method of claim 8 wherein step c) includes the step of performing a Fourier transform.

13. The method of claim 8 further comprising the step of:

e) quantizing the combined basis coefficients.

14. The method of claim 13 further comprising the step of:

f) entropy encoding the quantized combined basis coefficients.

15. The method of claim 8 further comprising the step of:

e) repeating steps c) through d) for each block of the plurality of blocks.

* * * * *